Aug. 2, 1949. W. J. BRETH 2,477,718
DEVICE FOR MOUNTING TIRE BEAD RINGS UPON THE BEAD
APPLYING ANNULUS OF TIRE BUILDING MACHINES
Original Filed June 14, 1944 2 Sheets-Sheet 1
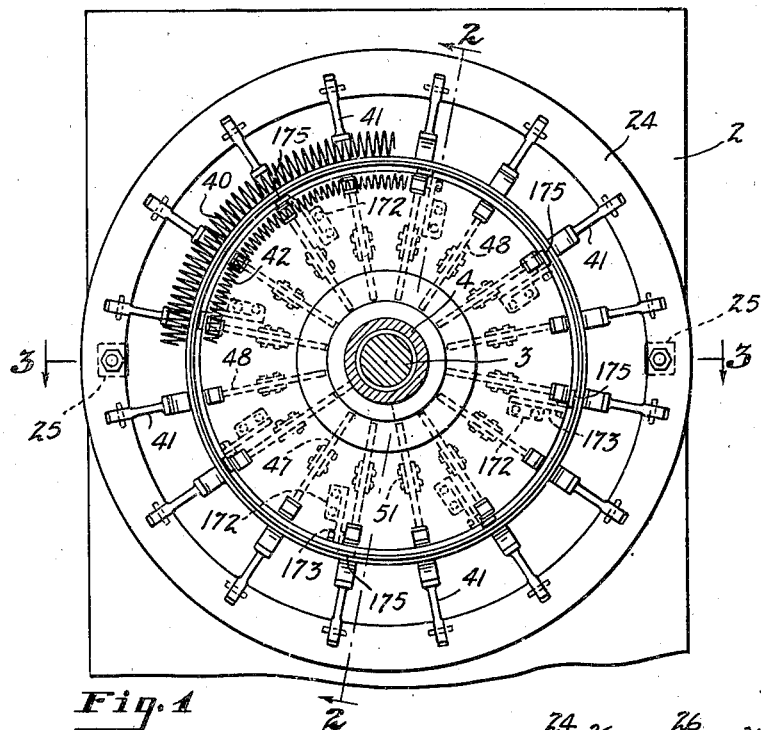
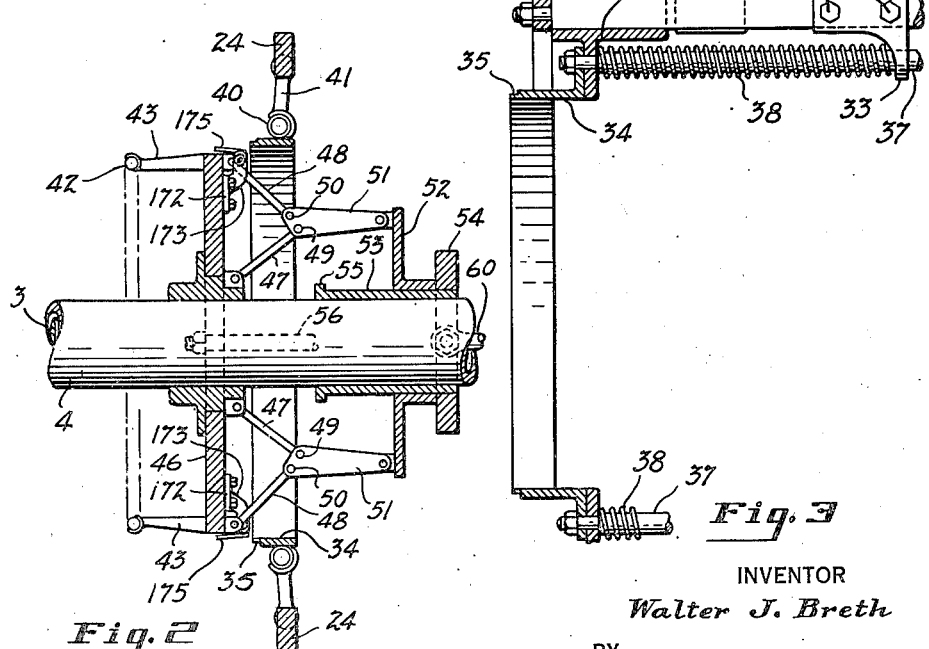
INVENTOR
Walter J. Breth
BY
Evans + McCoy
ATTORNEYS INVENTOR
Walter J. Breth
BY Evans + McCoy
ATTORNEYS Patented Aug. 2, 1949

2,477,718

UNITED STATES PATENT OFFICE 2,477,718

DEVICE FOR MOUNTING TIRE BEAD RINGS UPON THE BEAD APPLYING ANNULUS OF TIRE BUILDING MACHINES

Walter J. Breth, Akron, Ohio, assignor to The General Tire and Rubber Company, Akron, Ohio, a corporation of Ohio Original application June 14, 1944, Serial No. 540,306, now Patent No. 2,455,038, November 30, 1948. Divided and this application November 13, 1946, Serial No. 709,608

5 Claims. (Cl. 154—9)

This invention relates to a device for mounting tire bead rings upon the bead applying annulus of a tire building machine, and is a division of my copending application Serial No. 540,306, filed June 14, 1944, now Patent No. 2,455,038, November 30, 1948.

The invention has for its object to provide a device for automatically transferring a bead ring from a temporary support upon which it fits loosely, to a bead applying annulus that has a snug fit within the ring and that is adapted to press the bead ring axially against the shoulder of a tire building drum.

With the above and other objects in view, the invention may be said to comprise the transfer device as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a transverse vertical section through the drum shaft of a tire building machine between the drum and bead applying mechanism and showing the bead applying mechanism in elevation;

Fig. 2 is an axial section through the bead supporting annulus and associated mechanisms;

Fig. 3 is an axial section showing the mounting of the bead applying annulus;

Figure 4:
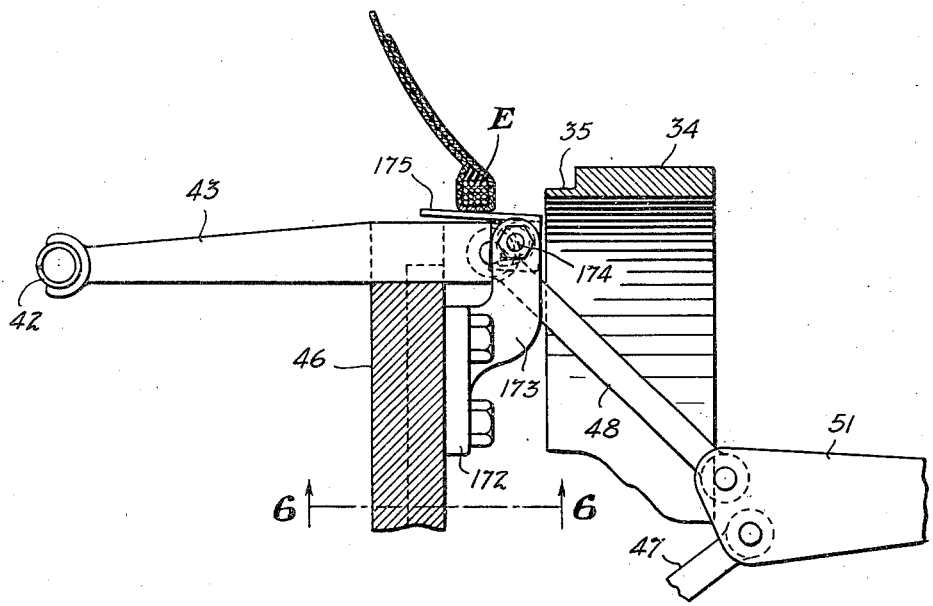
Fig. 4 is a fragmentary sectional view showing the bead ring on the temporary support prior to its transfer to the bead applying annulus.
Figure 5:
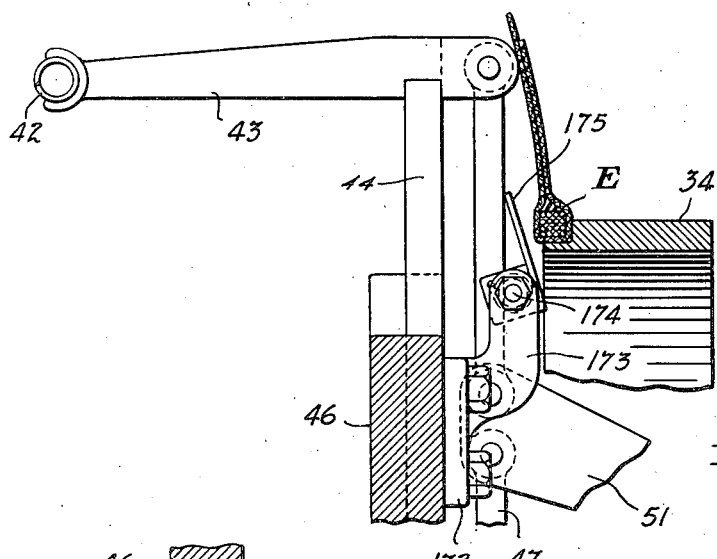
Fig. 5 is a view similar to Fig. 4 showing the transfer device in expanded position and the bead ring on the bead applying annulus.
Figure 6:
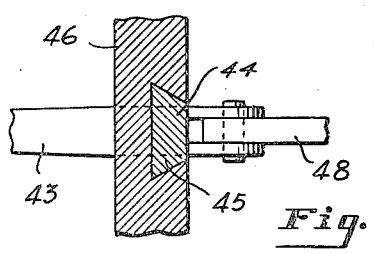
Fig. 6 is a section taken on the line indicated at 6—6 in Fig. 4.

The device of the present invention is part of the mechanism for applying a bead ring to a tire carcass on a tire building drum. As shown in the accompanying drawings, a suitable housing 2 provides a support for a shaft 3 which has a sleeve 4 mounted thereon. The shaft 3 provides a support for a conventional collapsible tire building drum (not shown) which is connected by suitable linkage to the sleeve and shaft so as to be expanded or collapsed by relative rotary movements of the sleeve and shaft as is common practice in the art.

The tire building machine has a plurality of axially movable annular members coaxial with the shaft 3 beyond one end of the drum. The machine to which the device of the present invention has been applied includes an annulus 24 that is carried by two identical diametrically opposed axially extending bars 25 that are mounted for endwise movement and adapted to be reciprocated axially by suitable means such as connecting rods 28. The rods 28 are connected to brackets 31 attached to the bars 25 by bolts 32, the brackets 31 being provided with inwardly projecting flanges 33. A bead ring applying annulus 34 is concentric with the annulus 24 and is mounted for movement within the annulus 24 toward and away from the tire building drum. The annulus 34 is provided with a rabbeted bead ring seat 35 which fits snugly within the bead ring to be applied to a tire carcass. As shown in Fig. 3, supporting brackets 36 attached to the annulus 34 are slidable on the bars 25 and carry rods 37 parallel with the bars 25 and slidable in apertures in the flanges 33 of the brackets 31. Coil springs 38 surround the rods 37 and are interposed between the brackets 31 and 36.

The bead ring applying annulus 34 normally travels with the annulus 24, but when the inward movement of the annulus 34 is impeded the springs 38 will yield and permit the annulus 24 to advance beyond the annulus 34. In applying the bead ring, the inward movement of the annulus 34 is stopped when the bead ring is pressed against the shoulder of the tire building drum and the annulus 24 carries a stitching annulus 40 in the form of an endless coil spring connected to the annulus 24 by a series of radially disposed links 41. The annulus 40 serves to stitch portions of the fabric overlying the shoulder portion of the drum. The bead ring is applied to carcass fabric which has been folded over an end shoulder of the drum, and for the purpose of so folding the fabric the machine is provided with a contractible endless coil spring annulus 42 that is adapted to be expanded to a diameter greater than that of the drum and to be contracted upon fabric projecting beyond the end of the drum to fold the fabric over the drum shoulder. The contractible annulus 42 is carried by axially extending arms 43 that are rigidly attached to the outer end of radial bars 44 that are slidably mounted in radially disposed dovetail slots 45 in the outer face of a disk 46 that is slidably mounted on the sleeve 4.

Suitable means is provided for simultaneously imparting radial outward movements of the arms 41 and 43 to expand the annulus 42. This movement is accomplished by means of identical toggles each consisting of an inner radially disposed link 47 pivoted to the hub of the disk 46, and an outer radially disposed link 48 pivoted to the outer end of one of the arms 43. The toggle links 47 and 48 are connected at their outer and inner ends respectively by pivots 49 and 50 to the inner ends of elongated axially extending actuating links 51 which are pivotally connected at their outer ends to a disk 52 that is mounted to slide axially upon a sleeve 53 that in turn slides on the sleeve 4. The movement of the disk 52 on the sleeve 53 is limited by a collar 54 on the outer end of the sleeve and by a flange 55 at the inner end of the sleeve. Movement may be imparted to the disk 52 by engagement of the collar 54 or flange 55 therewith when the sleeve 53 is shifted axially on the sleeve 4. The disk 46 is moved toward and away from the end of the drum by suitable means such as an actuating rod 56 indicated in dotted lines in Fig. 2. The sliding sleeve 53 may be moved axially on the sleeve 4 by suitable means such as rods 60 attached to the collar 54.

In the operation of the machine the spring annulus 42 is initially supported in the position shown in Fig. 2 and after the fabric forming the body of a tire carcass is applied to the drum, the annulus 42 is expanded by simultaneously imparting radial outward movement to the radial bars 44 to which the supporting arms 43 are attached. The annulus 42, after it has expanded, is moved axially toward the end of the drum to position the annulus around the projecting end of the fabric on the drum. The annulus 42 is then contracted to fold the fabric inwardly over the drum shoulder and the bead applying annulus 34 is moved axially over the disk 46 and the annulus 42 to press the bead ring against the drum shoulder.

At the start of each tire building operation it is necessary to mount a bead ring on the annulus 34, and where the annulus 34 is mounted between the drum and its support as illustrated herein, the bead ring is moved over the drum while it is collapsed in order to position it on the annulus 34. In machines of the type shown in my Patent 2,313,035, granted March 9, 1943, a substantially identical bead applying mechanism is provided at the opposite end of the drum on a frame that is mounted for movement toward and away from the end of the drum to permit removal of a completed tire from the drum, and the bead ring is placed in the bead applying mechanism on the movable frame while the frame is in retracted position.

The annulus 34 is preferably in the form of a rigid ring and its bead ring seat 35 is of a diameter to fit snugly within the bead ring E. To facilitate the placing of the bead ring E on the seats 35, the disk 46 has four or more angularly spaced brackets 172 attached thereto adjacent its periphery, and these brackets have arms 173 that project radially outwardly and carry hinge pivots 174 for a series of seating plates 175 that normally rest upon the outer faces of certain of the arms 43 when these arms are in their retracted positions. The pivots 174 are so located that the outer faces of the plates 175 lie slightly within the periphery of the seat 35 so as to provide a temporary bead ring support that is small enough in diameter to permit the bead ring E to be quickly and easily placed thereon. When the arms 43 are moved radially outwardly the plates 175 will be simultaneously swung outwardly and the simultaneous outward swinging movements of the plates 175 expands them within the interior of the bead ring and tilts them toward the bead seat 35 so as to simultaneously exert a radial outward thrust on the interior of the bead ring and a lateral thrust thereon to move the same onto the seat 35 so that the bead ring is properly positioned for application to the tire carcass after the folding operations are performed by the annulus 42.

It is to be understood that variations and modifications of the specific device herein shown and described for purposes of illustration, may be made without departing from the spirit of the invention.

What I claim is:

1. In a tire building machine a bead applying annulus having a circular bead ring seat, an independently movable expansible bead ring support of less diameter than said seat and positioned laterally of said annulus and alongside said seat, and means for expanding said support to transfer a bead ring from said support to said seat.

2. In a tire building machine a bead applying annulus having a circular bead ring seat, an independently movable expansible bead ring support of less diameter than said seat and positioned laterally of said annulus and alongside said seat, means for expanding said support to transfer a bead ring from said support to said seat, and means for moving said annulus axially over said support.

3. In a tire building machine a bead applying annulus having a circular bead ring seat, an independently movable expansible bead ring support of less diameter than said seat and positioned laterally of said annulus and alongside said seat, and means for expanding said bead ring support and for simultaneously tilting the same toward said seat to transfer a bead ring to said support.

4. In a tire building machine a bead applying annulus comprising a circumferentially continuous ring having a rabbeted edge portion forming a bead ring seat, a circular member of less diameter than said bead ring seat, a series of closely spaced axially extending arms connected to said member to swing radially about axes adjacent said seat, means on said member for normally retaining said arms substantially parallel to the axis to provide a bead ring support alongside said seat of slightly less diameter than said seat, and means for simultaneously swinging said arms outwardly about their axes to incline said arms toward said seat to transfer a bead ring to said seat.

5. In a tire building machine a bead applying annulus comprising a circumferentially continuous ring having a bead seat along an edge thereof, a disk of less diameter than said annulus and adapted to be positioned alongside said bead seat, closely spaced arms overlying the periphery of said disk and pivoted at the ends thereof adjacent said seat to swing radially, said arms forming a bead ring support of slightly less diameter than said seat, radially movable members carried by said disk and movable outwardly to swing said arms outwardly about their pivots to incline the same toward said seat, and means for simultaneously moving said radially movable members outwardly to swing said arms to their inclined positions to transfer a bead ring from said arms to said seat.

WALTER J. BRETH.

REFERENCES CITED

The following references are of record in the file of this patent:

UNITED STATES PATENTS

| Number | Name | Date |
|---|---|---|
| 1,200,014 | Paridon | Oct. 3, 1916 |
| 1,647,164 | Wikle | Nov. 1, 1927 |
| 2,034,642 | Stevens | Mar. 17, 1936 |